(12) United States Patent
Carditello et al.

(10) Patent No.: US 12,704,173 B2
(45) Date of Patent: Aug. 11, 2026

(54) GEARSHIFT LEVER ASSEMBLY WITH MAGNETIC FEELING FOR A MOTOR VEHICLE

(71) Applicant: FERRARI S.P.A., Modena (IT)

(72) Inventors: Tommaso Carditello, Modena (IT); Jean Paul Sultana, Modena (IT)

(73) Assignee: FERRARI S.P.A. (IT)

( * ) Notice: Subject to any disclaimer, the term of this patent is extended or adjusted under 35 U.S.C. 154(b) by 0 days.

(21) Appl. No.: 18/943,097

(22) Filed: Nov. 11, 2024

(65) Prior Publication Data

US 2025/0164006 A1 May 22, 2025

(30) Foreign Application Priority Data

Nov. 21, 2023 (IT) ........................ 102023000024669

(51) Int. Cl.
*F16H 59/10* (2006.01)
*G05G 5/06* (2006.01)

(52) U.S. Cl.
CPC ............... *F16H 59/10* (2013.01); *G05G 5/06* (2013.01); *G05G 2505/00* (2013.01)

(58) Field of Classification Search
CPC ....... F16H 59/10; G05G 5/06; G05G 2505/00
USPC ......................................................... 74/473.3
See application file for complete search history.

(56) References Cited

U.S. PATENT DOCUMENTS

2019/0154144 A1* 5/2019 Kim ....................... F16H 61/24

FOREIGN PATENT DOCUMENTS

| | | | | |
|---|---|---|---|---|
| CN | 113803453 A | | 12/2021 | |
| DE | 3138827 A1 | * | 4/1983 | ............. B60K 20/02 |
| DE | 4109544 A1 | * | 9/1992 | ............... H01H 5/02 |
| DE | 102006012890 A1 | * | 9/2007 | ........... H01H 36/006 |
| DE | 102006002634 B4 | * | 11/2009 | ............... G05G 5/03 |
| DE | 102012216548 A1 | * | 6/2013 | ............... G05G 5/03 |
| EP | 3658799 B1 | | 10/2021 | |
| GB | 2199926 A | * | 7/1988 | ............... H01H 5/02 |
| IT | 201900005726 A1 | | 10/2020 | |
| JP | H02105651 U | | 8/1990 | |
| JP | 2002254949 A | * | 9/2002 | ............. B60K 20/02 |
| JP | 2006244885 A | * | 9/2006 | ............. H01H 19/20 |
| KR | 102152702 B1 | | 9/2020 | |

(Continued)

OTHER PUBLICATIONS

Italian Search Report and Written Opinion, Italian Patent Application IT202300024669, Report Completion Jun. 19, 2024, 9 pp.

*Primary Examiner* — T. Scott Fix
(74) *Attorney, Agent, or Firm* — The Belles Group, P.C.

(57) ABSTRACT

A gearshift lever assembly includes a support base, a lever body coupled to the support base in a movable manner along a path comprising a plurality of predetermined positions relative to the support base, a first magnet fixed with respect to the lever body and having a first magnetic pole, and at least one corresponding second magnet for each one of said predetermined positions, the second magnet having a relative second magnetic pole opposite the first magnetic pole and being carried by the support base in a relative fixed position, such that said second pole magnetically co-operates with the first pole when the lever body is in the corresponding predetermined position between said predetermined positions, so that the corresponding second magnet exerts a magnetic attraction upon the first magnet.

14 Claims, 7 Drawing Sheets

(56) References Cited

FOREIGN PATENT DOCUMENTS

KR 102449851 B1 10/2022
SE 457680 B * 1/1989 ............... G05G 5/05

* cited by examiner

GEARSHIFT LEVER ASSEMBLY WITH MAGNETIC FEELING FOR A MOTOR VEHICLE

CROSS-REFERENCE TO RELATED APPLICATION

This patent application claims priority from Italian patent application no. 102023000024669 filed on Nov. 21, 2023, the entire disclosure of which is incorporated herein by reference.

TECHNICAL FIELD

The invention relates to a gearshift lever assembly for a motor vehicle, in particular for controlling a manual or automatic transmission of the motor vehicle.

BACKGROUND

As it is known, a motor vehicle generally has a gearshift lever to control a transmission, which could be, more specifically, a manual, automatic or semi-automatic transmission. The transmission and the relative gearshift lever are also present in fully electric motor vehicles, as well as in hybrid motor vehicles and motor vehicle exclusively having a heat engine. The transmission of fully electric motor vehicles is not normally mechanically connected to the lever, but the position of the latter is determined by means of sensors, whose signals permit an electronic control of the transmission. The transmission could be of any type, including a continuously variable transmission (CVT) that can change through a continuous range of gear ratios, or it can even be incorporated in an electric motor of the motor vehicle or be defined by the electric motor itself.

In any case, the gearshift lever has a plurality of predetermined positions corresponding to respective gears (including the reverse gear) or to operating states, such as a neutral state or a park state, as it is known for automatic transmissions. In the predetermined positions, the lever should conveniently be stable; in other words, a driver of the motor vehicle should exceed at least a minimum effort threshold to move the lever from one position in order to move it to another position. In this operation, in practice, the driver first receives a feeling of resistance to removing the lever from its current position, immediately followed by a feeling of release or liberation when the lever leaves the current position. Then, the driver receives a feeling of engagement when the lever reaches the other desired position. These feelings are typically ensured by friction or mechanical cooperation between transmission members that allow the lever to move between its predetermined positions.

In the automotive industry, known gearshift levers need to be improved, specifically in terms of a reduced noise associated with the movements of the lever and of a greater pleasantness of the feelings received, with particular reference to the overall fluidity of the movements of the lever. Furthermore, there is also a need to reduce the overall dimensions associated with the transmission members or, more in general, with the mechanical members that allow the lever to be moved between its predetermined positions.

The object of the invention is to fulfil at least one of the needs discussed above, preferably in a simple and repeatable fashion.

DESCRIPTION OF THE INVENTION

In one aspect, the invention can be a gearshift lever assembly for a motor vehicle, the gearshift lever assembly comprising a support base, a lever body graspable by a driver of the motor vehicle and movably coupled to the support base along a path comprising a plurality of predetermined positions relative to the support base, a first magnet fixed relative to the lever body and having a first magnetic pole, and at least one corresponding second magnet for each of said predetermined positions, the second magnet having a relative second magnetic pole opposite to the first magnetic pole and being carried by the support base in a relative fixed position, such that said second pole magnetically cooperates with the first pole when the lever body is in the corresponding predetermined position of said predetermined positions, so that the corresponding second magnet exerts a magnetic attraction on the first magnet.

In one aspect, the invention can be a transmission comprising the gearshift lever assembly of the preceding paragraph. In one form, the invention can be a motor vehicle comprising the gearshift lever assembly of the preceding paragraph.

In one aspect, the invention can be a gearshift lever assembly for a motor vehicle, the gearshift lever assembly comprising a base, a lever graspable by a driver of the motor vehicle and movable along a path comprising a plurality of predetermined positions relative to the base, a first magnet mounted to the lever, and a second magnet for each of said predetermined positions, each second magnet being fixed in position relative to the base such that a second magnet in a said predetermined position exerts a magnetic attraction on the first magnet when the lever is in that predetermined position.

In one aspect, the invention can be a transmission comprising the gearshift lever assembly of the preceding paragraph. In one form, the invention can be a motor vehicle comprising the gearshift lever assembly of the preceding paragraph.

In one aspect, the invention can be a gearshift control for a motor vehicle, the gearshift control comprising a base, an actuator graspable by a driver of the motor vehicle and movable along a path comprising a plurality of predetermined positions relative to the base, a first magnetic element mounted to the actuator, and a second magnetic element for each of said predetermined positions, each second magnetic element being fixed in position relative to the base such that a second magnetic element in a said predetermined position exerts a magnetic attraction on the first magnetic element when the actuator is in that predetermined position.

In one aspect, the invention can be a transmission comprising the gearshift control of the preceding paragraph. In one form, the invention can be a motor vehicle comprising the gearshift control of the preceding paragraph.

BRIEF DESCRIPTION OF THE DRAWINGS

Hereinafter, an embodiment of the invention will be described, in order to allow the latter to be better understood, by way of non-limiting example and with reference to the accompanying drawings, wherein.

DETAILED DESCRIPTION OF THE INVENTION

Figure 1:
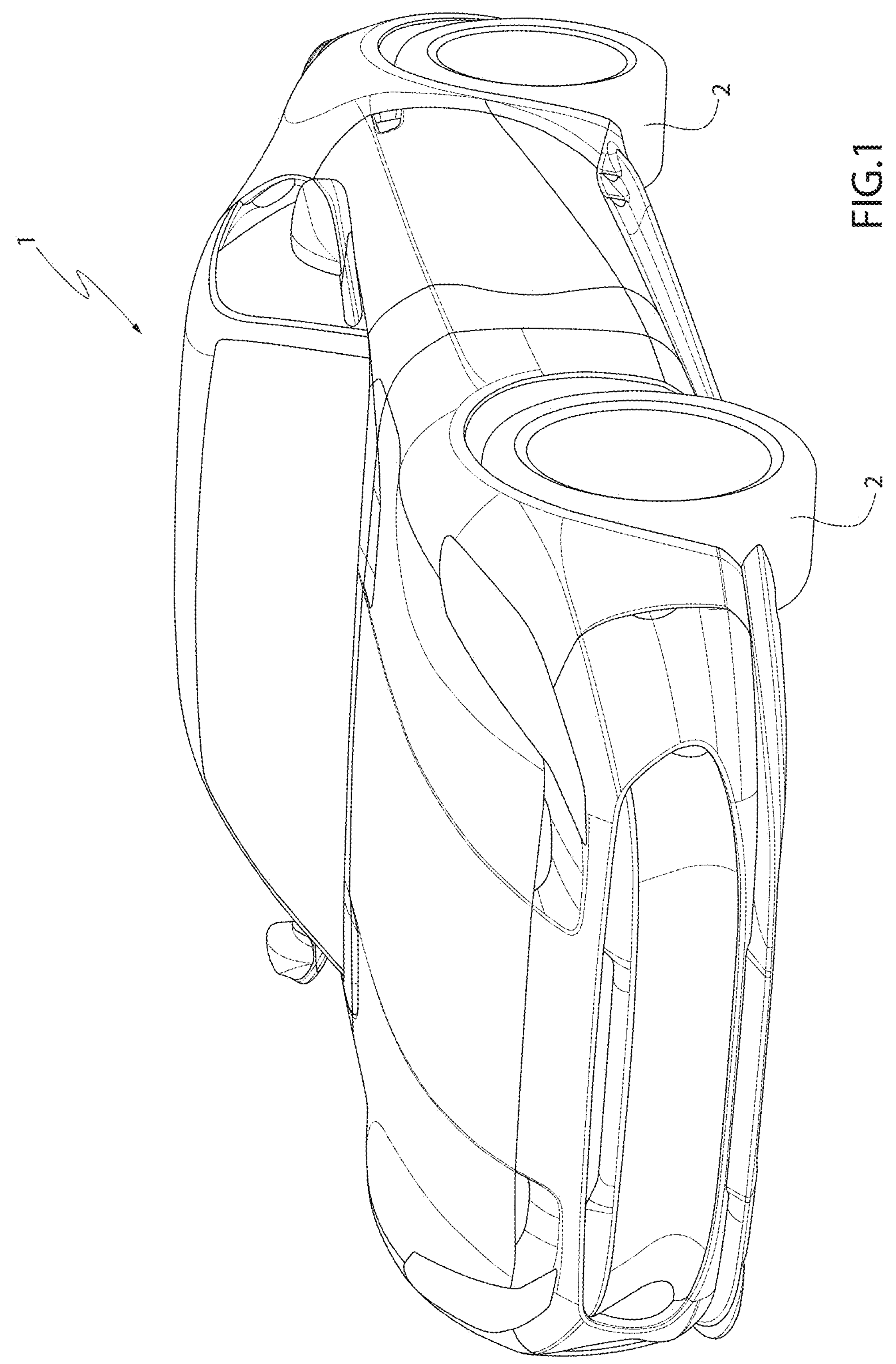
FIG. 1 is a perspective view of a motor vehicle comprising a gearshift lever assembly according to an embodiment of the invention.

In FIG. 1, reference number 1 is used to indicate, as a whole, a motor vehicle.

For the purposes of the invention, the motor vehicle 1 could have any type of propulsion apparatus with any type of powertrain, for example an internal combustion engine, an electric motor or other known types of powertrain assemblies.

The motor vehicle 1 has a plurality of wheels 2 that allow it to be used. In order to cause the rotation of the wheels 2, the motor vehicle 1 also has a transmission, for example of a known type and not shown herein, which transmits the output motion generated by the engine to the wheels 2.

The transmission sets a gear ratio, namely a ratio of the respective speeds, between the engine and the wheels 2.

The transmission could comprise a gearbox with a plurality of gears that can be selected to vary the gear ratio.

In other words, the gearbox can be controlled to vary the gear ratio, for example by selectively engaging the gears.

The gearbox could have a limited number of gears or even have a substantially infinite number of gears, thus defining a continuously variable transmission (CVT).

Continuously variable transmissions, as well as gearboxes with a limited number of gears, are generally known per se in the automotive industry, so that they will not be described in greater detail or shown in a specific manner.

The gearbox could also be absent, whereby the gear ratio could be fixed rather than variable. In this case, the rotation speed of the wheels 2 would be determined by the engine, which could still be controllable in speed.

Figure 2:
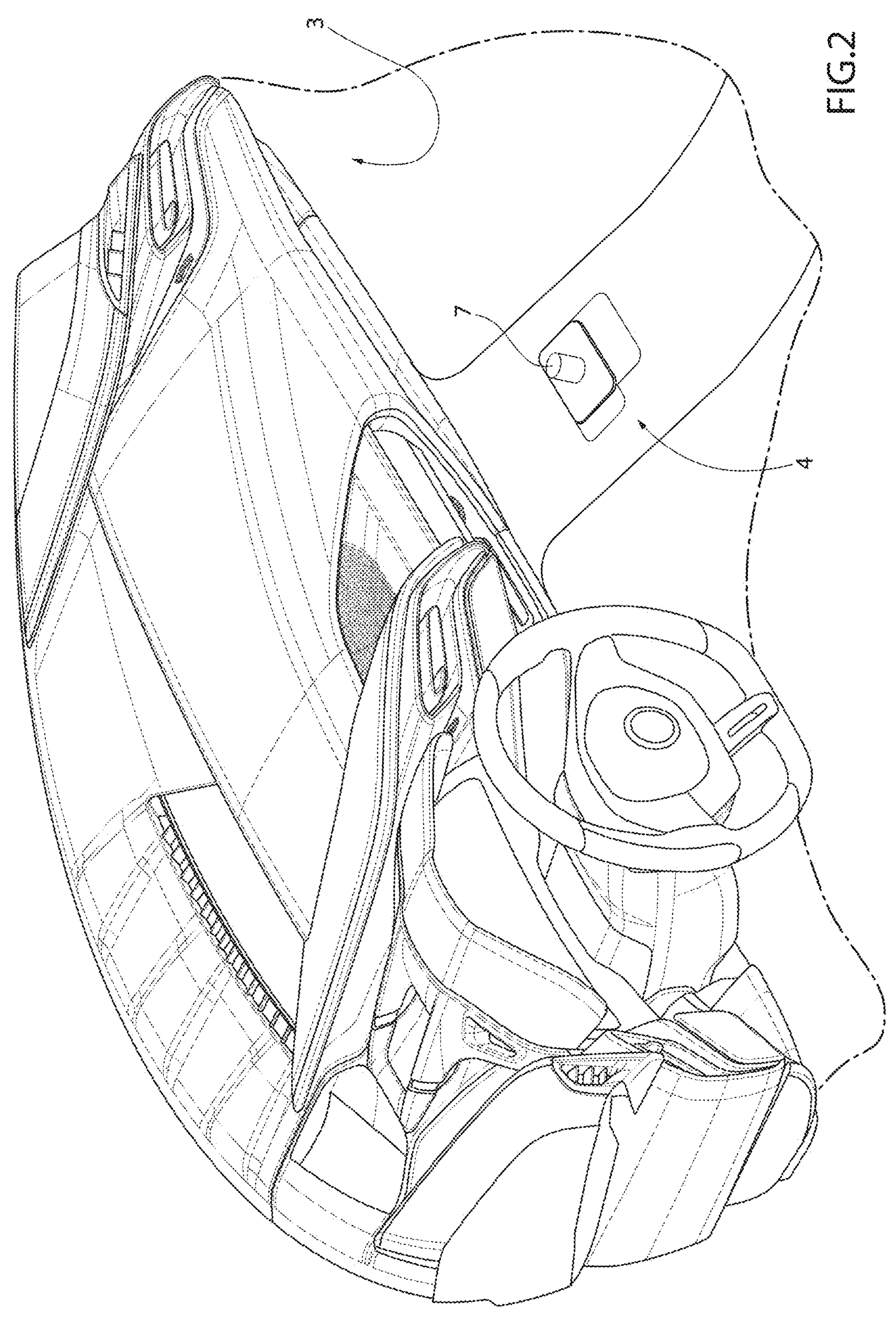
FIG. 2 is a perspective view, on a larger scale, of a passenger compartment of the motor vehicle of FIG. 1.

The motor vehicle 1 also has a passenger compartment 3 to accommodate a driver (FIG. 2).

Inside the passenger compartment 3, the motor vehicle 1 comprises a gearshift lever assembly 4.

Generally speaking, the gearshift lever assembly 4 is configured to allow the driver to control or select a state of the transmission of motion from the engine to the wheels 2, in particular by means of the transmission.

More in detail, the gearshift lever assembly 4 is configured to control a control unit of the motor vehicle 1, which, in turn, controls the state of the transmission of motion in a consequent manner, namely in a manner consequent to the selection made by the driver by means of the gearshift lever assembly 4.

Specifically, the gearbox of the transmission is of an automatic type, whereby the control unit adjusts the gear ratio, for example by selecting the engagement of a specific gear or by controlling a continuously variable transmission, based on the operation of the engine.

In particular, the control unit extracts information on the operation of the engine from specific transducers coupled to the control unit and configured to monitor the operation of the engine.

Here, i.e. with the automatic gearbox, the state of the transmission of motion could be selected by means of the gearshift lever assembly 4, for example from a park state P, a reverse state R, a neutral state N and a drive state D.

These states of the transmission of motion are typical for motor vehicles with an automatic gearbox, so they will not be explained in detail, nor will the operation of the control unit for each one of the states of the motion transmission.

The same states of the transmission of motion mentioned above could be selectable by means of the gearshift lever assembly 4 even if the gearbox were absent, as for example is the case in some fully electric motor vehicles, although with a known gearshift lever assembly that is different from the specific assembly 4 according to the invention.

This is however not limiting, since the gearshift lever assembly 4 could have been used to select a specific gear of the gearbox, which in this case would have been manually operated. Here, each gear would define a respective state of transmission of motion, in addition to the aforementioned reverse and neutral states N, D.

Therefore, in addition to one or more of the aforementioned states of transmission of motion, the states of transmission of motion that can be selected by means of the gearshift lever assembly 4 could include further states respectively associated with the engagement of specific gears of the gearshift or, more generally, with specific gear ratios between the engine and the wheels 2, including the reverse gear ratios.

The assembly 4 comprises a support base 5, which, in particular, is fixed to a body 6 of the motor vehicle 1.

Furthermore, the assembly 4 comprises a lever body 7 graspable by the driver and coupled to the base 5 in a movable manner along a path 8.

The lever body 7 is movable along the path 8 in a continuous manner, namely the lever body 7 can reach any point of the path 8, which can be geometrically represented by a continuous line, i.e. without interruptions.

The path 8 comprises a plurality of predetermined positions relative to the base 5; the predetermined positions specifically correspond to the selection of the motion transmission states.

More specifically, the path 8 or the assembly 4 have four positions corresponding to the selection of the park state, the reverse state, the neutral state and the drive state, respectively.

Figure 3:
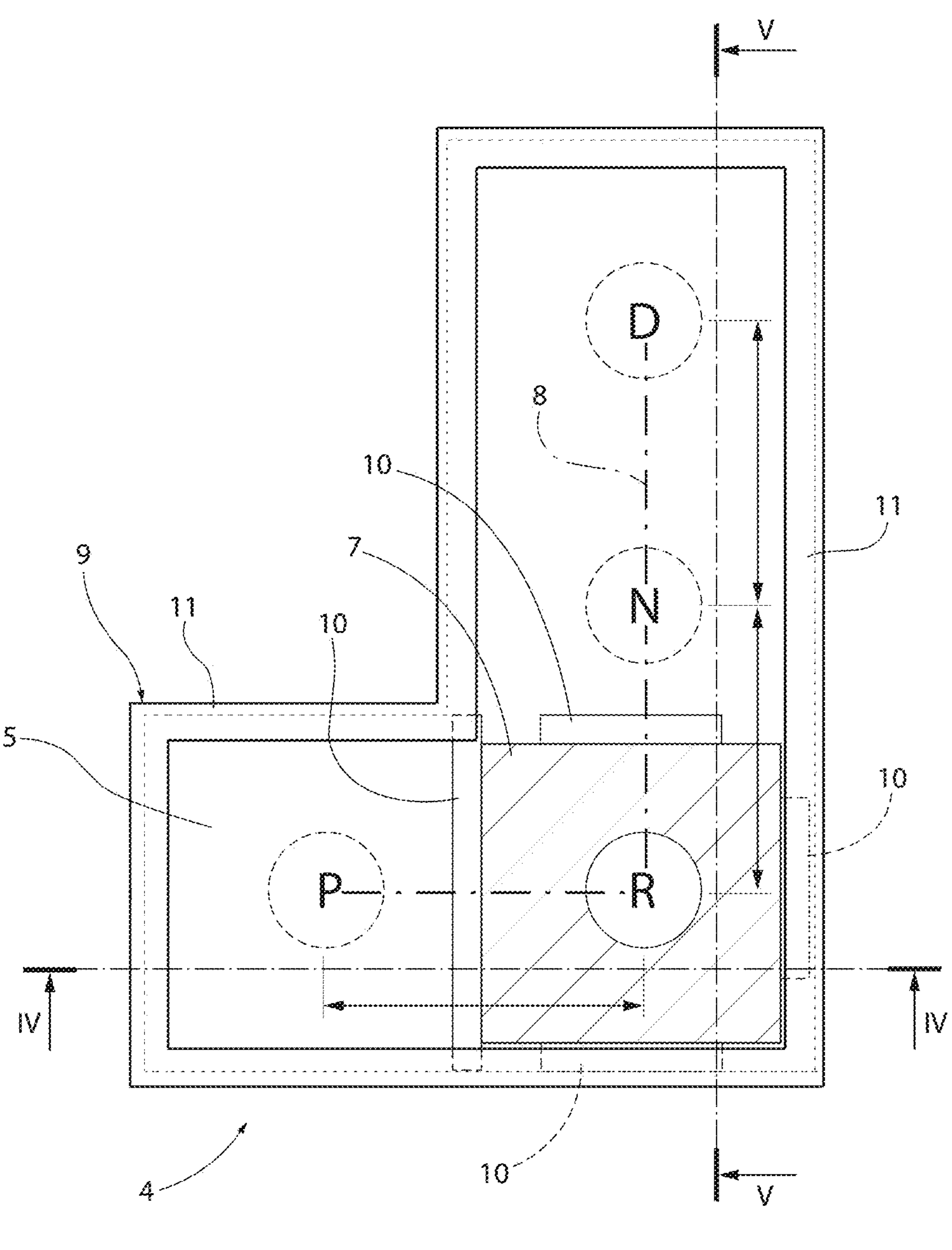
FIG. 3 is a view from the top, with parts removed for greater clarity, of the gearshift lever assembly of FIG. 2.

In the embodiment of FIG. 3, the base 5 comprises a guide device 9 configured to guide the lever body 7 along the path 8.

More in detail, the lever body 7 comprises one or more slides 10 coupled to the guide device 9 in a sliding manner along the path 8.

In particular, the guide device 9 comprises at least two guides 11, more in particular comprising respective beams with a C-shaped cross section facing one another other. The guides 11 substantially extend according to the path 8 and are engaged in a sliding manner by two respective slides 10 of the lever body 7.

With reference to FIG. 3, the path 8 extends on a plane according to a line, in particular consisting of one or more straight segments.

The line of the path 8 is defined, more in particular, by two straight line sections or segments, perpendicular to one another and having two respective coincident end points.

Therefore, in other words, the line of the path 8 is L-shaped, in that one of the two segments is in particular shorter than the other.

The path 8 could clearly have been different and, for example, even be defined by two H-shaped portions adjacent to one another and with a coincident long branch, i.e. similarly to the path of some known gearshift levers for controlling a five-speed manual transmission with additional reverse gear.

The assembly 4 further comprises a magnet 12 fixed relative to the lever body 7, namely carried by the lever body 7 in a fixed position.

The magnet 12 has two opposite magnetic poles 12*a*, 12*b*, which are in particular aligned along a magnetic axis or direction or axis 12*c*, more in particular of the straight kind.

Figures 4, 5:
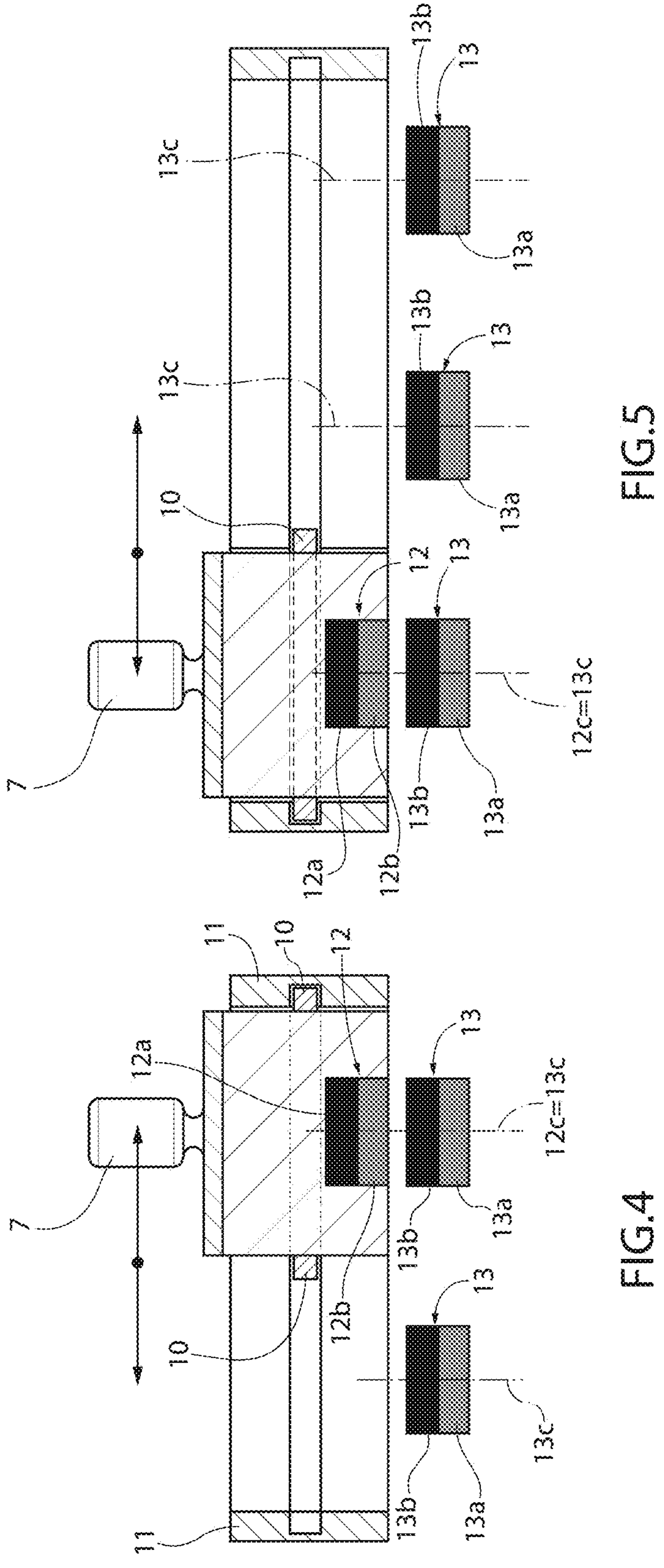
FIGS. 4 and 5 are respective cross sections, with some schematic parts, of the gearshift lever assembly of FIG. 3 according to section planes represented by lines IV-IV and V-V in FIG. 3.

In the specific example of FIGS. 4 and 5, as well as in the variants of FIGS. 6-9, the magnetic axis 12*c* is perpendicular to the path 8 or, more precisely, to the plane of the path 8.

Furthermore, the assembly 4 comprises a number of further magnets 13 at least equal to the predetermined positions.

The magnets 13 are carried by the base 5 in respective fixed positions, namely they are fixed relative to the base 5.

Furthermore, although they are fixed to the base 5, the magnets 13 are arranged or distributed along or according to the path 8, in particular at the predetermined positions.

Just like the magnet 12, one or each one of the magnets 13 also has two opposite magnetic poles 13*a*, 12*b*, which are in particular aligned along a magnetic axis or direction or axis 12*c*, more in particular of the straight kind. In the example of FIGS. 4 and 5, the magnetic axes 13*c* are parallel to the magnetic axis 12*c*.

The poles 13*b* are (magnetically) opposite relative to the pole 12*b*.

Each one of the magnets 13 is arranged so that the relative pole 13*b* magnetically cooperates with the pole 12*b* in a corresponding one of the predetermined positions of the lever body 7, namely when the lever body 7 is in said predetermined position. In this way, the corresponding magnet 13 exerts a magnetic attraction upon the magnet 12; indeed, the opposite poles 12*b*, 13*b* attract one another.

Therefore, in other words, when the lever body 7 reaches one of the predetermined positions, the magnet 12 cooperates or interacts with a corresponding one of the magnets 13. The magnet 12, more precisely, is attracted by the corresponding magnet 13.

This guarantees a stability of each one of the predetermined positions, since the driver has to overcome the magnetic attraction between the magnet 12 and the corresponding one of the magnets 13 in order to move the lever body 7 from the relevant predetermined position. Therefore, while moving the lever body 7 from any one of the predetermined positions, the driver receives a feeling of resistance due to the magnetic attraction between the magnet 12 and the corresponding magnet 13.

In the example of FIGS. 4 and 5, when the lever body 7 is in each one of the predetermined positions, the pole 12*b* and the pole 13*b* of the corresponding magnet 13 are aligned along the magnetic axis 13*c* or the magnetic axis 12*c*, here coinciding with one another.

Still in this last example, the magnets 13 corresponding to two adjacent or successive predetermined positions according to the path 8 are spaced apart from one another along the path 8 (namely, parallel to it) by means of an empty space or in any case without magnets.

Furthermore, in this last example, for each predetermined position there is one and only one corresponding magnet 13, which faces and, more precisely, is aligned with the magnet 12 according to the magnetic axes 12*c*, 13*c* when the lever body 7 is in the corresponding predetermined position.

Figures 6, 7:
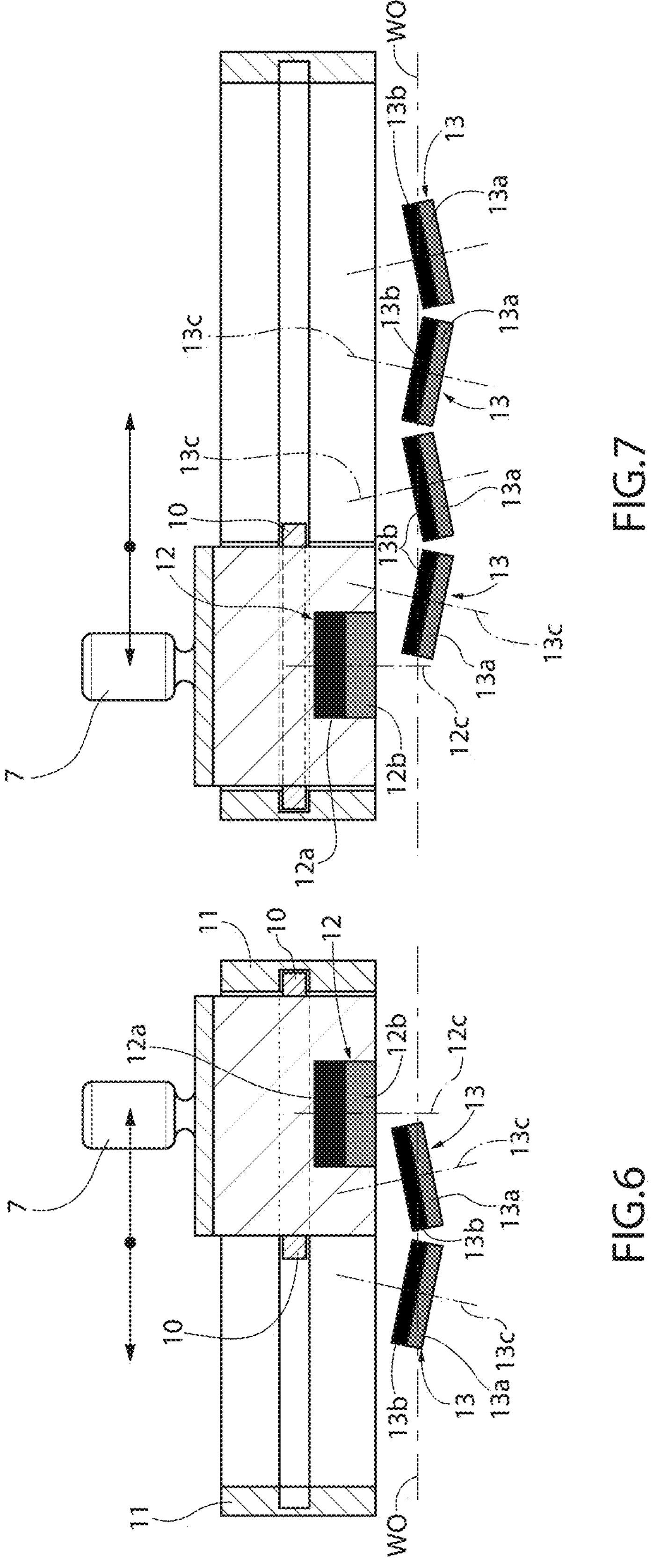
FIGS. 6 and 7 are similar to FIGS. 4 and 5 and relate to a first variant of the gearshift lever assembly of FIG. 3.

The variant of FIGS. 6 and 7 is similar to that of FIGS. 3 and 4, so that only the distinctive aspects thereof will be described using, where possible, the same reference symbols to indicate components shared by both variants.

In the example of FIGS. 6 and 7, each one of the magnetic axes 13*c* forms acute angles with the magnetic axis 12*c*, when the lever body 7 is in the corresponding predetermined position. In other words, for each one of the predetermined positions, the magnetic axis 12*c* is inclined with respect to the magnetic axis 13*c* of the corresponding magnet 13 and incident thereto.

In particular, two magnets 13 could correspond to a predetermined position; indeed, in the example of FIGS. 6 and 7, two magnets 13 correspond to the predetermined position associated with the neutral state.

Except for the predetermined position with two corresponding magnets 13, the adjacent or successive magnets 13 along the path have the respective magnetic axes 13*b* that form, between them, a relative acute angle by meeting towards the lever body 7. The two magnets 13 corresponding to one single predetermined position have the relative magnetic axes 13*c* that form, between them, a relative acute angle by meeting on the opposite side with respect to the one where the lever body 7 is located.

In this way, in practice, at a portion of the path 8 between two adjacent or successive predetermined positions along the path 8, the two adjacent magnets 13 respectively corresponding to the two predetermined positions form a depression or a V-shaped configuration towards the lever body 7 according to the direction of the magnetic axis 12*c*.

In each predetermined position of the lever body 7, the magnet 12 and the one or two magnets 13 corresponding to the predetermined position in question have a minimum distance from one another along the magnetic axis 12*c*.

Indeed, in the case of the predetermined position with two corresponding magnets 13, both the two magnets 13 have a minimum distance from the magnet 12 along the magnetic axis 12*c*, when the lever body 7 is in said predetermined position. Here, the two magnets 13 form a wedge or an upside-down V-shaped configuration towards the lever body 7.

In this way, the magnetic attraction gradually decreases as the lever body 7 moves away from each one of the predetermined positions. In particular, on the other hand, the magnetic attraction increases again as the lever body 7 approaches the adjacent or successive predetermined position according to the path 8, until the maximum magnetic attraction is reached when the lever body 7 reaches the adjacent or successive predetermined position.

To sum up, for a predetermined position, the magnet 12 and the magnet 13 corresponding to the predetermined position respectively have the magnetic poles 12*a*, 13*a* respectively opposite the magnetic poles 12*b*, 13*b*, as well as, in turn, respectively aligned with the magnetic poles 12*b*, 13*b* according to the respective magnetic axes 12*c*, 13*c*.

Furthermore, in particular, when the lever body 7 is in a predetermined position, the magnetic axis 12*c* forms an acute angle with the magnetic axis 13*c* of the magnet 13 corresponding to the predetermined position. Furthermore, here (when the lever body 7 is in a predetermined position), the magnet 12 and the magnet 13 corresponding to the predetermined position have a minimum distance from one another along the magnetic axis 12*c*, such that the magnetic attraction (between the magnets 12, 13) gradually decreases as the lever body 7 moves away from the predetermined position.

Alternatively or in addition, the magnet 12 and each magnet 13 respectively have the magnetic pole 12*a* and the corresponding magnetic pole 13*a* respectively opposite the magnetic pole 12*b* and the relative magnetic pole 13*b*, as well as, in turn, respectively aligned with the magnetic pole 12*b* and the relative magnetic pole 13*b* according to the magnetic axis 12*c* and the corresponding magnetic axis 13*c*. Furthermore, in particular, the magnetic axis 12*c* forms a relative acute angle with each magnetic axis 13*c* when the lever body 7 is in the corresponding predetermined position, where the magnet 12 and the corresponding magnet 13 have a minimum distance from one another along the magnetic axis 12*c*, such that the magnetic attraction gradually decreases as the lever body 7 moves away from the corresponding predetermined position.

Still with reference to the example of FIGS. 6 and 7, the magnets 13 are distributed along the path 8 in a substantially continuous manner, i.e. such that a magnetic attraction continuously subsists during a movement of the lever body 7 traversing the whole path 8.

More precisely, the magnets 13 define a path of their own identical to the path 8 but arranged on a different plane parallel to that of the path 8. For this reason, the two paths can be considered, as a whole, as path 8.

The term substantially used above relates to the fact that a physical separation may exist between adjacent magnets 13, but the gap between the adjacent magnets 13 remains negligible in the sense that the magnetic attraction is not interrupted by the passage of the lever body 7 from one predetermined position to another adjacent or successive one.

Rather, the magnetic attraction rises and falls in a wave-like manner with magnetic attraction peaks at the predetermined positions.

Figures 8, 9:
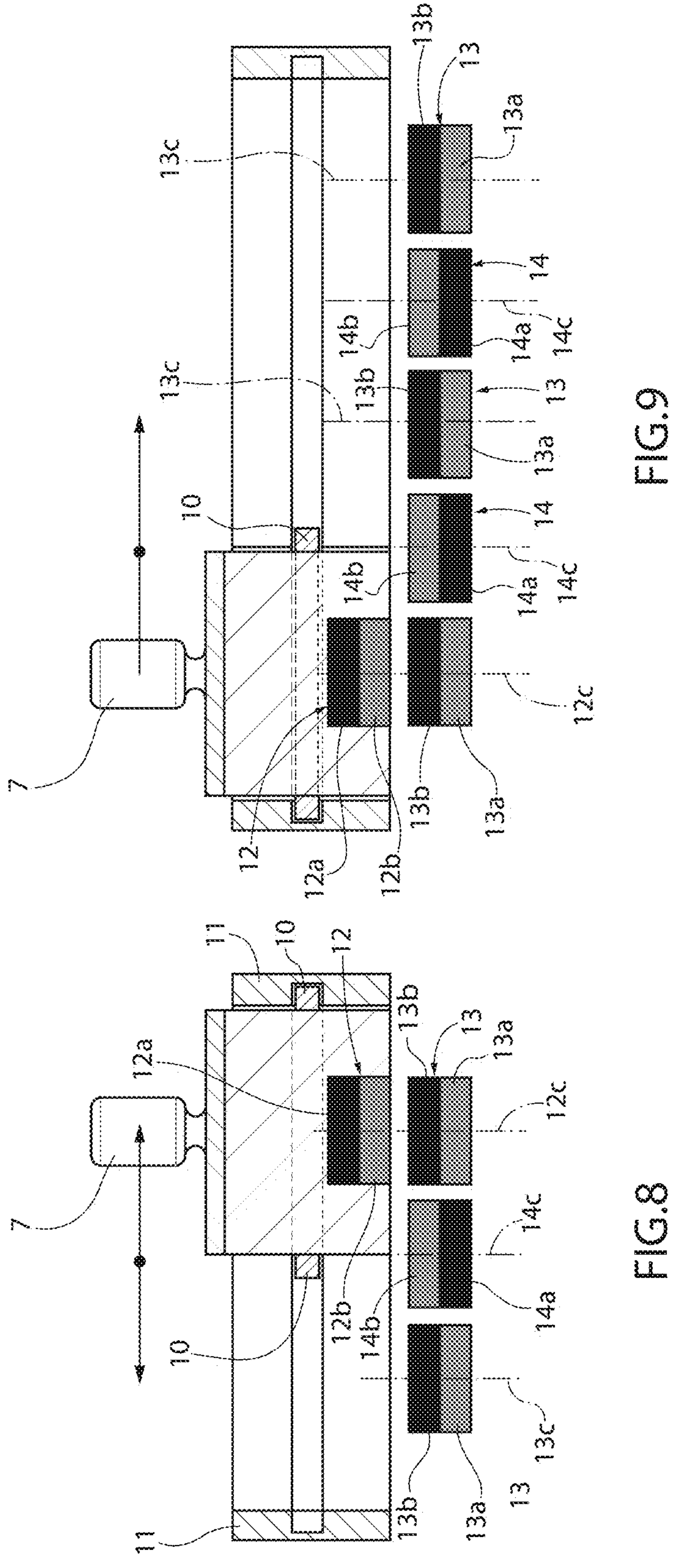
FIGS. 8 and 9 are similar to FIGS. 4 and 5 and relate to a second variant of the gearshift lever assembly of FIG. 3.

The variant of FIGS. 8 and 9 is similar to that of FIGS. 3 and 4, so that only the distinctive aspects thereof will be described using, where possible, the same reference symbols to indicate components shared by both variants.

In the variant of FIGS. 8 and 9, the assembly 4 comprises further magnets 14, each having, just like each one of the magnets 13, two opposite magnetic poles 14*a*, 14*b*, which, in particular, are aligned along a magnetic axis or direction or axis 14*c*, more in particular of the straight kind.

In the example of FIGS. 8 and 9, the magnetic axes 14*c* are parallel to the magnetic axis 12*c*, as well as to the magnetic axes 13*c*.

The poles 13*b* are (magnetically) concordant relative to the pole 12*b*.

The magnets 14 are carried by the base 5 in respective fixed positions; each one of the magnets 14 is arranged so that the relative pole 14*b* magnetically cooperates with the pole 12*b* when the lever body 7 is in a corresponding intermediate position along the path 8 between two adjacent or successive predetermined positions, so that the magnet 14 exerts a magnetic repulsion upon the magnet 12 during a transit of the lever body between the two adjacent or successive predetermined positions.

More in detail, each magnet 14 is arranged between two corresponding magnets 13 that are adjacent or successive to one another along the path 8.

Specifically, each magnet 14 is aligned with the magnet 12 along the magnetic axis 12*c* when the lever body 7 moves to the corresponding intermediate position.

Therefore, in particular, the magnets 13, 14 are distributed along the path 8 (or along the path of the magnets 13 mentioned above) according to an alternated sequence. In other words, each magnet 13 is followed by a magnet 14 according to the path 8 and vice versa.

Preferably, the magnets 13, 14 are distributed in a substantially continuous manner, i.e. such that the magnetic cooperation or interaction of the magnets 13, 14 with the magnet 12 continuously subsists during a movement of the lever body 7 traversing the whole path 8.

Again, the term substantially relates to the fact that a physical separation may exist between two successive magnets 13, 14 but the gap between the successive magnets 13, 14 remains negligible in the sense that the magnetic interaction of the magnet 12 is not interrupted by the passage of the lever body 7 from one predetermined position to another adjacent or successive one.

In practice, the magnetic interaction of the magnet 12 during the travel of the lever body 7 along the entire path 8 consists of an alternation between attraction with each one of the magnets 13, whenever the lever body 7 reaches the corresponding predetermined position, and repulsion with each one of the magnets 14, whenever the lever body 7 moves between two adjacent or successive corresponding predetermined positions.

The embodiment of FIG. 10 will be described below. This last embodiment is similar to the one of FIG. 3, whereby all the variants of FIGS. 3-8 can also be applied to the embodiment of FIG. 10, even though they are not explicitly repeated for the sake of conciseness. The embodiment of FIG. 10 will be described only in what distinguishes it from that of FIG. 3, possibly using the same reference symbols to indicate the same components.

Figure 10:
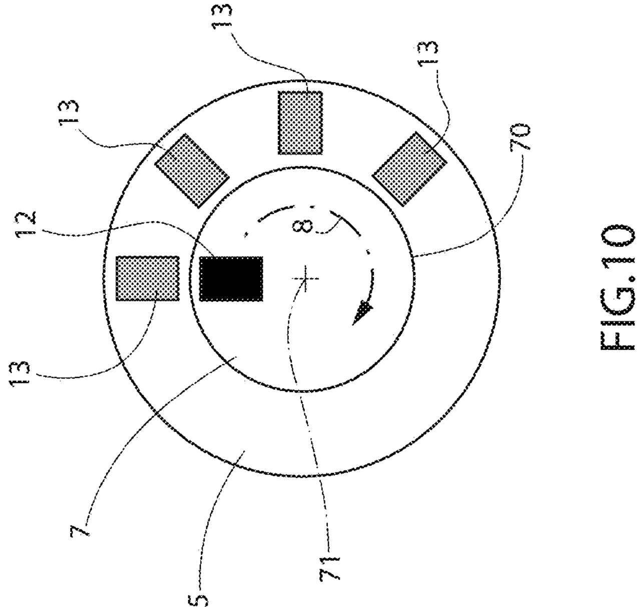

In the embodiment of FIG. 10, the lever body 7 comprises a knob 70 that can rotate relative to the base 5 around a rotation axis 71.

Therefore, the path 8 is circular, i.e. it is defined by an arc of a circle.

Furthermore, the magnetic axes 12*c*, 13*c*, 14*c* (where the magnets 14 are optionally provided, even though they are not shown in FIG. 9) are directed radially relative to the rotation axis 71.

Figure 11:
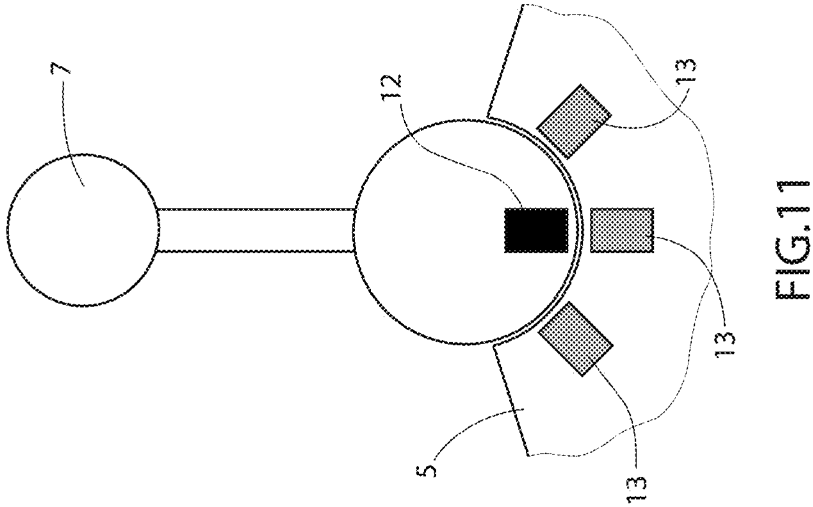
FIGS. 10 and 11 are schematic representations of respective alternative embodiments of the gearshift lever assembly according to the invention.

The embodiment of FIG. 11 is similar to the one of FIG. 10, so that it will be described only in the aspects that distinguish it therefrom, possibly using the same reference symbols to indicate the same components.

Again, the contents of the variants of FIGS. 6-9 are applicable to the embodiment of FIG. 11, even though they are not explicitly repeated for the sake of conciseness.

In the embodiment of FIG. 11, the lever body 7 is coupled to the base 5 by means of a ball coupling, such that, in particular, the lever body 7 and the base 5 form part of a ball joint.

Therefore, in this case, the path 8 extends along a spherical surface, instead of extending on a plane as is the case in other embodiments described and shown herein. The spherical surface is virtually defined by the ball coupling.

Furthermore, the magnetic axes 12*c*, 13*c*, 14*c* (where the magnets 14 are optionally provided, even though they are not shown in FIG. 10) are directed radially relative to the centre of the spherical surface.

Owing to the above, the advantages of the gearshift lever assembly 4 according to the invention are evident.

The magnetic attraction of the magnet 12 with the respective magnets 13 in the corresponding predetermined positions is perfectly suitable for returning feelings to the driver that are similar to those provided by the mechanical members of known solutions.

In addition, the magnetic cooperation is not noisy and does not involve wear of parts in mechanical contact.

Furthermore, the alternation between magnetic attraction and repulsion guaranteed by the alternation between the magnets 13, 14, as shown in the variant of FIGS. 8 and 9, is particularly advantageous as it corresponds to a greater feeling of fluidity of the movement of the lever body 7 for the driver, as well as to a more energetic engagement/disengagement feeling.

Finally, the gearshift lever assembly 4 according to the invention can clearly be subject to changes and variants, which, though, do not go beyond the scope of protection defined by the appended claims.

In particular, the number and shape of the components described and shown herein could be different.

The invention claimed is:

1. A gearshift lever assembly for a motor vehicle, the gearshift lever assembly comprising:

a support base;

a lever body graspable by a driver of the motor vehicle and movably coupled to the support base along a path comprising a plurality of predetermined positions relative to the support base;

a first magnet fixed relative to the lever body and having a first magnetic pole; and at least one corresponding second magnet for each of said predetermined positions, the second magnet having a relative second magnetic pole opposite to the first magnetic pole and being carried by the support base in a relative fixed position, such that said second magnetic pole magnetically cooperates with the first magnetic pole when the lever body is in the corresponding predetermined position of said predetermined positions, so that the corresponding second magnet exerts a magnetic attraction on the first magnet, wherein the first magnet has a third magnetic pole opposite the first magnetic pole, wherein each second magnet has a fourth magnetic pole opposite the second magnetic pole thereof, wherein the first magnetic pole and the third magnetic pole are aligned with each other according to a first rectilinear direction, wherein the second magnetic pole and the fourth magnetic pole of each second magnet are aligned with each other according to a second rectilinear direction, wherein the first rectilinear direction, when the lever body is in the corresponding predetermined position, forms with the second rectilinear direction of the corresponding second magnet an acute angle, the first magnet and the corresponding second magnets having a minimum distance between each other along the first rectilinear direction when the lever body is in the corresponding predetermined position, such that the magnetic attraction gradually decreases with a departure of the lever body from the corresponding predetermined position.

2. The gearshift lever assembly according to claim 1, wherein the second magnets are distributed along the path such that the second rectilinear directions of second magnets adjacent to each other form a further relative acute angle.

3. The gearshift lever assembly according to claim 2, wherein the second magnets are distributed along the path in a substantially continuous manner, such that magnetic attraction subsists continuously during a movement of the lever body traversing the whole path.

4. The gearshift lever assembly according to claim 1, wherein the path extends on a plane according to a L-shaped line.

5. A motor vehicle comprising a gearshift lever assembly according to claim 1.

6. A gearshift lever assembly for a motor vehicle, the gearshift lever assembly comprising:

a base;

a lever graspable by a driver of the motor vehicle and movable along a path comprising a plurality of predetermined positions relative to the base;

a first magnet mounted to the lever, the first magnet having a first magnetic polarity axis; and a second magnet for each of said predetermined positions, each second magnet having a second magnetic polarity axis, each second magnet being fixed in position relative to the base such that a second magnet in a said predetermined position exerts a magnetic attraction on the first magnet when the lever is in that predetermined position and such that the second magnetic polarity axis of the second magnet in that predetermined position extends at an angle relative to the first magnetic polarity axis.

7. The gearshift lever assembly according to claim 6, wherein the gearshift lever assembly comprises a plurality of second magnets at each said predetermined position.

8. A gearshift control for a motor vehicle, the gearshift control comprising:

a base;

an actuator graspable by a driver of the motor vehicle and movable along a path comprising a plurality of predetermined positions relative to the base;

a first magnetic element mounted to the actuator; and a second magnetic element for each of said predetermined positions, each second magnetic element being fixed in position relative to the base such that a second magnetic element in a said predetermined position exerts a magnetic attraction on the first magnetic element when the actuator is in that predetermined position, wherein the second magnetic elements are arranged along the path and arranged at an angle relative to the path such that the second magnetic elements create an arrangement of peaks and depressions that create an array of magnetic peaks aligned with the predetermined positions, and wherein each said magnetic peak is defined intermediate two adjacent second magnetic elements each having a polarity facing a different magnetic valley, the polarity being opposite the polarity of the first magnetic element.

9. The gearshift control according to claim 8, wherein the second magnetic elements are arranged in an undulating arrangement.

10. The gearshift control according to claim 8, wherein the path comprises an L-shaped path.

11. The gearshift lever assembly according to claim 2, wherein the adjacent second magnets are arranged such that the second magnetic pole and the fourth magnetic pole of each adjacent second magnet defines an oriented polarity that is the same for each adjacent second magnet.

12. The gearshift lever assembly according to claim 1, wherein the second magnets are arranged in a series of consecutive magnets such that the second magnetic pole and the fourth magnetic pole of each consecutive magnet defines an oriented polarity that is the same for each consecutive magnet.

13. The gearshift lever assembly according to claim 6, wherein adjacent second magnets have the same polarity, which is opposite to the polarity of the first magnet.

14. The gearshift lever assembly according to claim 6, wherein the second magnets are arranged in a series of consecutive magnets having the same polarity, which is opposite to the polarity of the first magnet.

* * * * *